US010756393B2

(12) United States Patent
Lim et al.

(10) Patent No.: US 10,756,393 B2
(45) Date of Patent: Aug. 25, 2020

(54) METHOD FOR PREVENTING DUPLICATE ALLOCATION OF ID TO BATTERY MODULES

(71) Applicant: LG Chem, Ltd., Seoul (KR)

(72) Inventors: Geun Wook Lim, Daejeon (KR); Duk Su Kim, Sejong-Si (KR); Jong Kook Lee, Daejeon (KR); Ho Soo Kim, Daejeon (KR); Sung Hyun Cho, Daejeon (KR); Jong Doo Park, Daejeon (KR); Jin Seok Heo, Daejeon (KR)

(73) Assignee: LG Chem, Ltd. (KR)

( * ) Notice: Subject to any disclaimer, the term of this patent is extended or adjusted under 35 U.S.C. 154(b) by 346 days.

(21) Appl. No.: 15/935,711

(22) Filed: Mar. 26, 2018

(65) Prior Publication Data

US 2018/0287218 A1 Oct. 4, 2018

(30) Foreign Application Priority Data

Mar. 28, 2017 (KR) .......................... 10-2017-0039356

(51) Int. Cl.
*H02J 7/00* (2006.01)
*H01M 10/42* (2006.01)

(52) U.S. Cl.
CPC ..... *H01M 10/4207* (2013.01); *H01M 10/425* (2013.01); *H01M 2010/4271* (2013.01); *H02J 7/0021* (2013.01); *H02J 7/00045* (2020.01)

(58) Field of Classification Search
CPC .......... H01M 10/4207; H01M 10/425; H01M 2010/4271; H02J 7/00045; H02J 7/0021
See application file for complete search history.

(56) References Cited

U.S. PATENT DOCUMENTS

| 5,206,578 | A | * | 4/1993 | Nor | H02J 7/0021 320/118 |
| 5,600,566 | A | * | 2/1997 | Park | G01R 31/3648 702/63 |
| 5,694,019 | A | * | 12/1997 | Uchida | H02J 7/0027 320/106 |
| 8,633,801 | B2 | * | 1/2014 | Iwai | G06F 1/26 320/106 |
| 2012/0206102 | A1 | * | 8/2012 | Okamura | H01M 10/425 320/112 |
| 2012/0268069 | A1 | * | 10/2012 | Park | H01M 10/425 320/116 |
| 2015/0180270 | A1 | * | 6/2015 | Takano | H04B 5/0031 320/103 |

(Continued)

FOREIGN PATENT DOCUMENTS

| KR | 20130033197 A | 4/2013 |
| KR | 10-1386080 B1 | 4/2014 |
| KR | 101632350 B1 | 6/2016 |

*Primary Examiner* — Arun C Williams
(74) *Attorney, Agent, or Firm* — Lerner, David, Littenberg, Krumholz & Mentlik, LLP

(57) ABSTRACT

The present disclosure relates to a method for preventing duplicate allocation of an ID to battery modules, and in particularly, to a method for preventing duplicate allocation of an ID to battery modules wherein an ID is prevented from being allocated in a duplicated manner by diagnosing each state where the ID is to be allocated in a duplicated manner.

12 Claims, 4 Drawing Sheets

(56) References Cited

U.S. PATENT DOCUMENTS

| | | | |
|---|---|---|---|
| 2016/0006085 A1* | 1/2016 | Toya | H02J 7/0045 |
| | | | 429/90 |
| 2016/0269095 A1* | 9/2016 | Hirata | H04Q 9/00 |
| 2016/0272083 A1* | 9/2016 | Dai | B60H 1/00571 |
| 2018/0012484 A1* | 1/2018 | Sakabe | H04W 72/08 |

* cited by examiner

METHOD FOR PREVENTING DUPLICATE ALLOCATION OF ID TO BATTERY MODULES

CROSS-REFERENCE TO RELATED APPLICATION

This application claims priority to Korean Patent Application No. 10-2017-0039356 filed on Mar. 28, 2017 the disclosure of which is incorporated herein by reference in its entirety.

TECHNICAL FIELD

The present disclosure relates to a method for preventing duplicate allocation of an ID to battery modules, and in particularly, to a method for preventing duplicate allocation of an ID to battery modules wherein an ID is prevented from being allocated in a duplicated manner by diagnosing each state where the ID is to be allocated in a duplicated manner.

RELATED ART

A battery pack (hereinafter battery) is typically configured from a plurality of battery modules, each of which being configured from a plurality of unit cells.

The cell includes a positive electrode current collector, a separator, an active material, an electrolyte, and an aluminum thin film layer, and the like, and is charged/discharged by an electro-chemical reaction between elements.

Furthermore, the battery additionally includes a Battery Management System (BMS) for monitoring and controlling a state of the battery, and an algorithm is applied thereto in order to measure a state value of a current, voltage and a temperature, etc., control charge/discharge, perform a cell balancing control, or estimate a stage of charge (SOC).

In addition, the battery mainly uses a multi-slave structure formed of a plurality of slave BMSs in charge of controlling each battery module and a master or main BMS for integrating to control the plurality of slave BMSs in order to monitor a plurality of battery modules and enhance an efficiency of control.

In such a structure, the master BMS checks a current state of the battery and communicates with the slave BMSs to gather data for the plurality of batteries managed by the slave BMSs so as to use the data to the charge/discharge control.

Also, for the above-described data gathering or command signal delivery, an individual ID of each slave BMS node is required, and to this end, a typical method for reading ID information preset in a hardware circuit has been used.

However, such a method requires the information on each battery module to be pre-stored in the master BMS, and when a problem occurs in a battery module, it is not easy to replace only the corresponding battery module.

As a measure for addressing such a problem, unlike the above-described method, a method has been performed which automatically allocates an ID by sequentially driving each battery module.

In the above-described method, first, power of a first battery module is manually driven so that an ID may be automatically allocated to 1 and the first battery module is designated as a master BMS.

Then, the ID-allocated first battery module drives a second battery module through a communication connector so that an ID is allocated as 2.

In addition, the ID-allocated second battery module drives a third battery module through a communication connector so that an ID is allocated as 3. Thereafter, when the battery modules are sequentially driven and IDs are allocated thereto, the number of finally connected battery modules may become automatically aware.

However, during automatic ID allocation, when external power is flown in and the battery module is driven in a state where an ID is not allocated to a slave BMS, a problem occurs in which an ID of a master BMS is automatically allocated to the battery modules to which IDs are not allocated.

As another problem, when one battery module is used and even one communication connector is connected, a turned-off battery module becomes driven, an ID of a master BMS is allocated thereto, and thus the ID of the master BMS are allocated in plurality.

In addition, as still another problem, when a plurality of battery modules are used, an installer makes an error and the battery modules are manually driven, an ID of a master BMS is allocated to an in-between battery module and battery modules to which communication connectors of both sides of the ID-allocated battery module are respectively connected are driven through the communication connectors.

Accordingly, an identical ID of a slave BMS is allocated to the battery modules at both sides of the battery module to which the ID of the master BMS are allocated, and thus it is difficult to be aware of the number of the battery modules and control the entire battery.

Accordingly, as described above, it is required to develop a technology for preventing ID allocation in a duplicated manner which occurs at the time of flow-in of external power, or when a single battery module or an in-between battery module is driven.

RELATED ART DOCUMENT

Patent Document (Patent document 1) KR1386080 B

SUMMARY

The present disclosure provides a method for preventing duplicate allocation of an ID to battery modules at the time of flow-in of external power or when a single battery module or an in-between battery module is driven.

In accordance with an exemplary embodiment, a method for preventing duplicate allocation of an ID, which prevents duplicate allocation of an ID at a time of sequentially and automatically allocating IDs to battery modules configured in plurality, includes: an ID allocation checking process for checking whether IDs are respectively allocated to battery modules, when external power is input; an ID deletion process for deleting the IDs of all the ID-allocated battery modules, when it is checked that there is a battery module to which an ID is not allocated in the ID allocation checking process; and a battery module termination process for terminating all the battery modules so as to enable IDs of the battery modules to be reallocated, after the IDs allocated to all the ID-allocated battery modules are deleted in the ID deletion process, wherein when it is checked that the IDs are allocated to all the battery modules in the ID allocation checking process, the IDs allocated already are used.

The ID allocation checking process may further include a use number checking process for checking a pre-stored number of battery modules to be used, wherein it is checked whether the IDs as many as the number of battery modules to be used are allocated.

In the ID allocation checking process, whether the ID is allocated may be checked by receiving an ID response signal through a communication connector.

The communication connector may be connected only to a battery module to be driven.

In accordance with another exemplary embodiment, a method for preventing duplicate allocation of an ID, which prevents duplicate allocation of an ID at a time of sequentially and automatically allocating IDs to battery modules configured in plurality, includes: a communication connector connection checking process for checking, when one battery module is to be used, connection of a communication connector of the battery module to be used; an ID deletion process for deleting IDs of all ID-allocated battery modules, when the communication connector of the battery module to be used is connected; and a battery module termination process for terminating driving of the battery modules so as to enable IDs of the battery modules to be reallocated, after the IDs allocated to the battery modules are deleted in the ID deletion process, wherein when it is checked that the communication connector of the battery module to be used is not connected in the communication connector connection checking process, the IDs allocated already are used.

The connection of the communication connector may be disconnected in the battery module termination process.

The communication connector may be connected only to a battery module to be driven.

In accordance with yet another exemplary embodiment, a method for preventing duplicate allocation of an ID, which prevents duplicate allocation of an ID at a time of sequentially and automatically allocating IDs to battery modules configured in plurality, includes: a communication connector connection checking process for checking connection of a communication connector of a battery module to which an ID of a master Battery Management System (BMS) is allocated, when a plurality of battery modules are used; an ID deletion process for deleting all ID-allocated battery modules, when it is checked that two communication connectors of the battery module to which the ID of the master BMS are connected in the communication connector connection checking process; and a process for using the IDs allocated already, when it is checked that one communication connector of the batter module to which the ID of the master BMS is allocated in the communication connector connection checking process.

In accordance with still another exemplary embodiment, a device included in a BMS configured in plurality in each battery module prevents duplicate allocation of an ID at a time of sequentially and automatically allocating IDs to the battery modules, wherein each of the battery modules includes: a communication unit configured to check connection of a communication connector and transmit/receive a signal to/from another battery module through the communication connector; an ID allocation determination unit configured to determine whether an ID is allocated to the battery module on a basis of the signal transmitted/received through the communication unit, when an external voltage is applied; a storage unit configured to store the ID allocated to the battery module and a number of battery modules to be used; and a number checking unit configured to check the number of battery modules to be used through the storage unit.

The communication unit may transmit an ID response signal, when an ID request signal is received which has been transmitted from a battery module to which an ID of a master BMS is allocated.

The stored IDs may be deleted from the storage unit, when an ID deletion signal is transmitted from a battery module to which an ID of a master BMS is allocated.

The device may further include a battery module termination unit configured to terminate driving of the battery modules, when the stored IDs are deleted from the storage unit.

BRIEF DESCRIPTION OF THE DRAWINGS

Exemplary embodiments may be understood in more detail from the following description taken in conjunction with the accompanying drawings, in which.

DETAILED DESCRIPTION

Hereinafter, exemplary embodiments according to the present disclosure will be described in detail with reference to contents illustrated in the accompanying drawings. However, the present disclosure is not limited or restricted to the exemplary embodiments. Rather, these embodiments are provided so that this disclosure will be thorough and complete, and will fully convey the scope of the present disclosure to those skilled in the art.

In addition, it will be understood that, although the terms first, second, etc. may be used herein to describe various elements, these elements should not be limited by these terms. The terms are used only for the purpose of distinguishing one component from another component. For example, a first element could be termed a second element, and, similarly, a second element could be termed a first element, without departing from the scope of example embodiments. Terms used herein are provided for merely explaining specific embodiments of the present disclosure, not limiting the disclosure. The singular forms "a," "an" and "the" are intended to include the plural forms as well, unless the context clearly indicates otherwise.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant. In this case, the meanings of the arbitrarily selected terminologies shall be defined in the relevant part of the detailed description. Accordingly, the specific terms used herein should be understood based on the unique meanings thereof and the whole context of the present disclosure.

Embodiment 1

Hereinafter, a method of preventing duplicate allocation of an ID to battery modules according to an embodiment of the present disclosure will be described.

The method of preventing duplicate allocation of an ID to battery modules according to the present disclosure checks whether an ID is allocated at the time of supply of external power to prevent an ID of a master Battery Management System (BMS) from being allocated in a duplicated manner.

Figure 1:
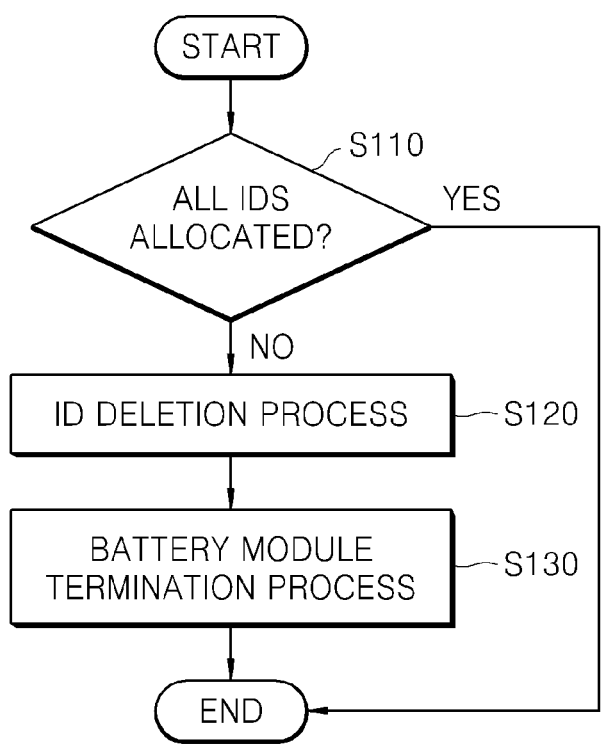
FIG. 1 is a flowchart of an embodiment of a method for preventing duplicate allocation of an ID to battery module according to an embodiment of the present disclosure.

FIG. 1 is a flowchart of a method for preventing duplicate allocation of an ID to battery modules according to an embodiment of the present disclosure.

In relation to FIG. 1, in the method for preventing duplication allocation of an ID to battery modules according to an embodiment of the present disclosure, at the time of an input of external power, it is checked whether IDs are respectively allocated to battery modules (an ID allocation checking process, S110), and when it is checked that there is a battery module to which the ID is not allocated, the IDs allocated to all other battery modules are deleted (an ID deletion process, S120).

In the ID deletion process S120, after the IDs allocated to the all other battery modules are deleted, all the battery modules are terminated such that IDs of the battery modules are reallocated (a battery module termination process, S130).

When it is checked that the IDs are allocated to all the battery modules in the ID allocation checking process S110, the IDs allocated already are used.

Each process of the method for preventing duplicate allocation of an ID to battery modules will be described in detail.

The ID allocation checking process S110 is a process for checking whether the IDs are respectively allocated to the battery modules at the time of the input of external power, and when the ID is not allocated, a battery module to which the ID is not allocated is driven according to the input of the external power and an ID of a master BMS is automatically allocated thereto in a duplicated manner.

In this way, when the ID of the master BMS is allocated in the duplicated manner, the number of all the battery modules is not accurately recognized and accordingly, the batteries are not operated insomuch as the capacity of the batteries and limitation is also raised in control of the batteries.

In addition, the ID allocation checking process S110 is to check a case where external power is applied in the middle of performing automatic ID allocation, and thus, when the automatic ID allocation is finished, the next process, namely, the ID deletion process S120 is not performed.

In addition, the ID allocation checking process S110 further includes a use number checking process for checking the pre-stored number of battery modules to be used, and it is checked whether IDs as many as the number of battery modules to be used are allocated.

Furthermore, in a scheme for checking whether IDs are allocated to all battery modules, when a battery module ID finally received in response to transmission of an ID request signal of each battery module through a communication connector is the same number as the number checked in the use number checking process, IDs of all the battery modules in a current battery may be considered to be allocated already.

For example, the number of all the battery modules to be used is 9 and the finally received battery module ID is 7, additional two IDs of 1, which means the master BMS, is considered to be generated.

Furthermore, a communication connector is connected only to a driven battery module to allow the battery modules not to be driven in excess of the use number checked in the use number checking process.

In the ID deletion process S120, the IDs of all the ID-allocated battery modules are deleted, when it is checked that there is a battery module to which an ID is not allocated in the ID allocation checking process S110.

This means that the IDs of all the ID-allocated battery modules are deleted such that an installer may remove the input external power and reallocate the IDs.

In addition, an ID deletion request signal is also transmitted to the battery module having the ID of the master BMS from another master BMS through the communication connector.

Furthermore, in the battery module termination process S130, when the IDs of all the ID-allocated battery modules are deleted in the ID deletion process, all the battery modules are terminated such that IDs of the battery modules are reallocated.

This enables the installer to remove the input external power, manually drive the first battery module, and make IDs of the battery modules be reallocated from the beginning.

In addition, a driving termination signal is also transmitted to the battery modules having the ID of the master BMS from another master BMS through the communication connector.

Embodiment 2

Hereinafter, a method of preventing duplicate allocation of an ID to battery modules according to a second embodiment of the present disclosure will be described.

The method of preventing duplicate allocation of an ID to a battery module according to the present disclosure checks connection of the communication connector to prevent an ID of a battery module from being allocated in a duplicated manner, when one battery module is to be used.

Figure 2:
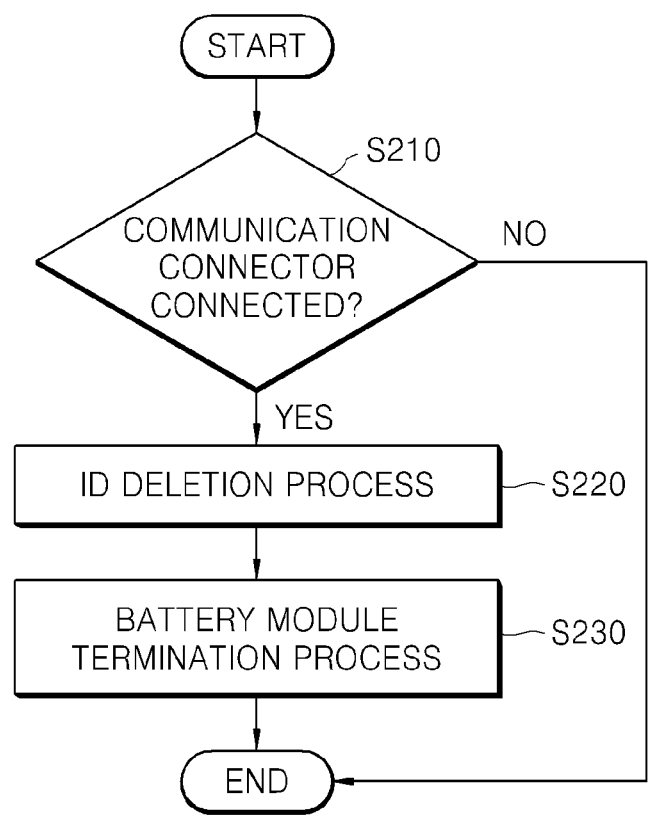
FIG. 2 is a flowchart of a method of duplicate allocation of an ID to battery modules according to a second embodiment of the present disclosure.

FIG. 2 is a flowchart of a method of duplicate allocation of an ID to battery modules according to a second embodiment of the present disclosure.

In relation to FIG. 2, according to a second embodiment of the method of preventing duplicate allocation of an ID to battery modules according to the present disclosure, when one battery module is to be used, connection of a communication connector of the battery module to be used is checked (a communication connector connection checking process S210), and an ID allocated to the battery module is deleted when the communication connector of the battery module to be used is connected (an ID deletion process, S220).

When the ID allocated to the battery module is deleted in the ID deletion process S220, driving of the battery module is terminated such that the ID of the battery module is reallocated (a battery module termination process, S230).

When it is checked that IDs are allocated to all the battery modules in the communication connector connection checking process S210, the IDs allocated already are used.

Each process of the method for preventing duplicate allocation of an ID to battery modules will be described in detail.

The communication connector connection checking process S210 is a process for checking connection of a communication connector of a battery module to be used, and when one battery module is to be used, it is required that an ID of the battery module is allocated with the ID of the master BMS and the communication connector is not connected.

In addition, the communication connector is connected only to the battery module to be driven, and therefore, when the communication connector is connected to a battery module not to be driven, the ID of the master BMS is allocated to the battery module to be used.

Then, a battery module located next to the connected battery module is driven and the ID of the master BMS is automatically allocated thereto. Here, the reason why the ID of the master BMS is allocated to the battery module located next is because information that only one battery module is to be used is pre-stored in the battery module to be used and thus an ID allocation signal of a slave BMS is not transmitted.

This allows only the battery module to be used to be driven so as to prevent unnecessary performance degradation, since performance is degraded according to repetition of charge/discharge of the battery module.

Accordingly, when one battery module is to be used, an ID to be allocated is prevented from being duplicated by checking whether the communication connector is connected.

In addition, in the ID deletion process S220, the IDs of all the ID-allocated battery modules are deleted, when it is checked that there is a battery module to which an ID is not allocated in the communication connector connection checking process S210.

This means that the IDs of all the ID-allocated battery modules are deleted such that an installer may remove the input external power and reallocate the IDs.

In addition, an ID deletion request signal is also transmitted to the battery module having the ID of the master BMS from another master BMS through the communication connector.

Furthermore, in the battery module termination process S230, after the IDs allocated to all the battery modules are deleted in the ID deletion process, all the battery modules are terminated such that IDs of the battery modules may be reallocated.

This means that at the time of terminating the battery module, when the connection of the communication connection is disconnected and all the battery modules are terminated, the installer manually drives a first battery module to enable IDs of the battery modules to be reallocated from the beginning.

In addition, a driving termination signal is also transmitted to the battery module having the ID of the master BMS from another master BMS through the communication connector.

Embodiment 3

Hereinafter, a method of preventing duplicate allocation of an ID to battery modules according to a third embodiment of the present disclosure will be described.

The method of preventing duplicate allocation of an ID to battery modules according to the present disclosure checks connection of the communication connector of a battery module to which an ID of a master BMS is allocated to prevent the ID of the battery module from being allocated in a duplicated manner, when a plurality of battery modules are to be used.

Figure 3:
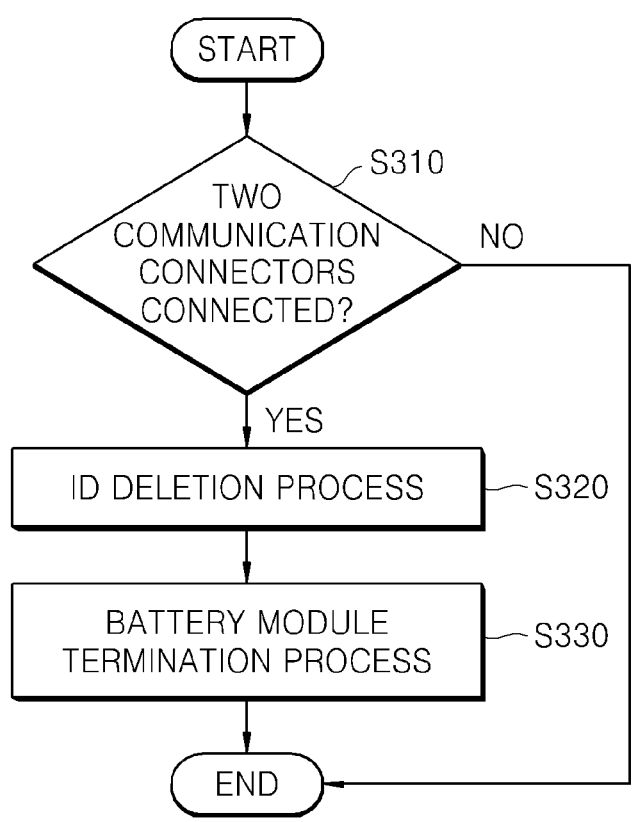
FIG. 3 is a flowchart of a method of duplicate allocation of an ID to battery modules according to a third embodiment of the present disclosure.

FIG. 3 is a flowchart of a method of duplicate allocation of an ID to battery modules according to a third embodiment of the present disclosure.

In relation to FIG. 3, according to the third embodiment of the method of preventing duplicate allocation of an ID to battery modules according to the present disclosure, when the plurality of battery modules are to be used, connection of a communication connector of a battery module to which an ID of a master BMS is allocated is checked (a communication connector connection checking process S310), and when two communication connectors of the battery module to which the ID of the master BMS is allocated are connected, an ID allocated to the battery module is deleted (an ID deletion process, S320).

After the ID allocated to the battery module is deleted in the ID deletion process S320, driving of the battery module is terminated such that the ID of the battery module is reallocated (a battery module termination process, S330).

When it is checked that one communication connector of the battery module to which the ID of the master BMS is allocated is connected in the communication connector connection checking process S310, the IDs allocated already are used.

Each process of the method for preventing duplicate allocation of an ID to battery modules will be described in detail.

The communication connector connection checking process S310 is a process for checking the connection of the communication connector of the battery module to which the ID of the master BMS is allocated, when the plurality of battery modules are to be used. When two communication connectors of the battery module to which the ID of the master BMS are connected, this means that the installer drives first a battery module located in a middle stage of a battery configuration.

When the battery module located in the middle stage of the battery configuration is driven first, the first driven battery module is allocated with the ID of the master BMS and then drives a battery module located next.

However, when the battery module to which the ID of the master BMS is located in the middle stage, two connectors are connected and two battery modules are located in the next stage, and in this case, an identical ID of a slave BMS is allocated to each battery module located in the next stage.

In this way, only one communication connector is required to connected to the battery module to which the ID of the master BMS is allocated, and thus when the plurality of battery modules are to be used, the number of connected communication connectors of the battery module to which the ID of the master BMS is allocated is checked to prevent an ID from being allocated in a duplicated manner.

In addition, in the ID deletion process S320, when it is checked that two communication connectors of the battery model to which the ID of the master BMS is allocated are connected in the communication connector connection checking process S310, the IDs of all the ID-allocated battery modules are deleted.

In addition, an ID deletion request signal is also transmitted to the battery module having the ID of the master BMS from another master BMS through the communication connector.

Furthermore, in the battery module termination process S330, after the IDs allocated to all the battery modules are deleted in the ID deletion process, all the battery modules are terminated such that IDs of the battery modules are reallocated.

This enables the installer to manually drive a first battery module to allow IDs of the battery modules to be reallocated from the beginning, when all the battery modules are terminated.

In addition, a driving termination signal is also transmitted to the battery module having the ID of the master BMS from another master BMS through the communication connector.

Embodiment 4

Hereinafter, a device for preventing duplicate allocation of an ID to battery modules according to an embodiment of the present disclosure will be described.

The device for preventing duplicate allocation of an ID to battery modules according to an embodiment of the present disclosure diagnoses and controls a case where an ID of a battery module is allocated in a duplicated manner, and accordingly enables a battery to be stably installed even a mistake of an installer and a system error.

Figure 4:
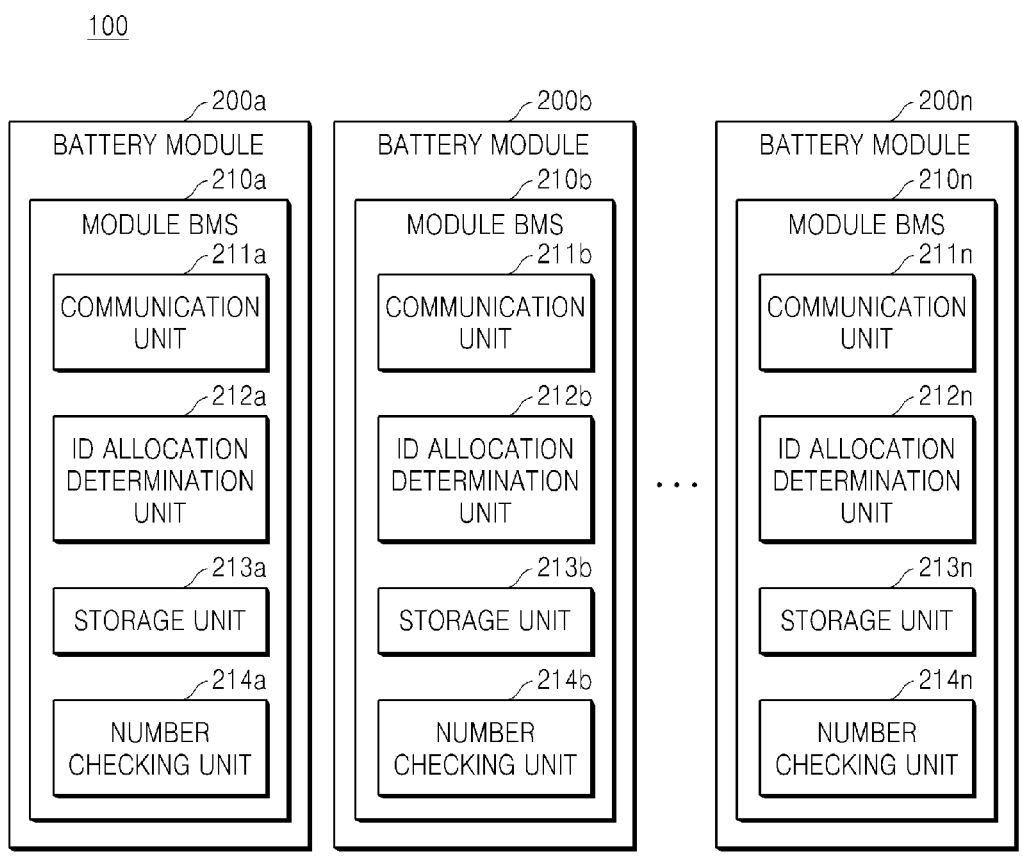
FIG. 4 is a configuration diagram of a device for preventing duplicate allocation of an ID to battery modules according to an embodiment of the present disclosure.

FIG. 4 is a configuration diagram of a device for preventing duplicate allocation of an ID to battery modules according to an embodiment of the present disclosure.

In relation to FIG. 4, a device 100 for preventing duplicate allocation of an ID to battery modules according to an embodiment of the present disclosure is configured from a communication unit 211 for checking connection of a communication connector and transmitting/receiving a signal to/from another battery module through the communication connector, an ID allocation determination unit 212 for determining whether an ID is allocated to a battery module on the basis of a signal transmitted/received through the communication unit in a case of supply of external power, a storage unit 213 for storing the ID allocated to the battery module and the number of battery modules to be used, and a number checking unit 214 for checking the number of battery modules to be sued through the storage unit 213.

In addition, a voltage measurement unit is further included which measures a voltage applied from the outside, and when the voltage applied from the outside exceeds a prescribed range, it is determined that all the battery modules are driven. Thus whether IDs are allocated to all the battery modules is determined through the ID allocation determination unit 212.

Furthermore, the device 100 for preventing duplicate allocation of an ID to battery modules is included in each module BMS of a battery module.

Accordingly, the storage unit 213 and the voltage measurement unit may use a memory and a voltage measurement unit inside the module BMS without additional element.

Each element of the device for preventing duplicate allocation of an ID to battery modules will be described in detail.

The communication unit 211 checks connection of the communication connector and transmits/receives a signal to/from another battery module through a communication connector.

When one battery module is to be used, the communication connector is not required to be connected, and when a plurality of battery modules are to be used, only one connector of a battery module to which an ID of a master BMS is allocated is required to be connected.

In addition, for a battery module to which an ID of a slave BMS, one or more communication connectors are required to be connected.

Accordingly, according to the BMS of the battery module, the communication unit 211 checks the connection number of the communication connectors to prevent an ID from being allocated in a duplicated manner.

Furthermore, when an ID request signal for requesting ID information having been transmitted from the battery module to which the ID of the master BMS is allocated is received, the communication unit 211 transmits an ID response signal including the ID information to enable the ID allocation determination unit 212 in the master BMS to determine whether the ID is allocated according to whether the ID response signal is received.

Furthermore, the communication connector is connected to only one battery module to be driven and disconnected at the time of terminating driving of the battery module, and thus the connection is performed as many as the number of battery modules to be used through the communication unit 211 in the master BMS at the time of rebooting.

In addition, when an external voltage is measured in the voltage measurement unit, the ID allocation determination unit 212 determines whether an ID of a battery module is allocated on the basis of a signal transmitted/received through the communication unit.

This is a configuration only used in the master BMS, and whether IDs are allocated to all the battery modules may be determined by comparing an ID of an ID response signal finally received from the communication unit 211 with the number of battery modules to be used which is checked in the number checking unit 214.

For example, when the number of all the battery modules to be used is 10, and the ID of the finally received ID response signal is 6, it is determined that the IDs are not allocated to all the battery modules.

When determining that the IDs are not allocated to all the battery modules, the ID allocation determination unit 212 generates an ID deletion signal to transmit the ID deletion signal to each battery module through the communication unit 211.

Then, the storage unit 213 stores the IDs allocated to the battery modules and the number of battery modules to be used.

In addition, when the ID deletion signal is transmitted from the battery module to which the ID of the master BMS is allocated, the stored IDs are deleted to enable IDs to be reallocated.

Furthermore, when the stored IDs are deleted from the storage unit 213, a battery module termination unit for terminating driving of the battery module is further included to terminate all the battery modules and enable an installer to drive a first battery module and IDs to be sequentially reallocated.

In addition, the number checking unit 214 checks the number of battery modules to be used which is stored in the storage unit 213 and allows the ID allocation determination unit 212 to check whether the IDs are allocated to all the battery modules.

According to a method of preventing duplicate allocation of an ID to battery modules may stably install battery modules by detecting a case where an ID is allocated in a duplicated manner at the time of flow-in of external power, or when driving one battery module or an in-between battery module is to be used, and controlling the ID to be reallocated.

The present disclosure has been described using preferred embodiments. However, it is to be understood that the scope of the present disclosure is not limited to the disclosed embodiments. Therefore, it will be readily understood by those skilled in the art that various modifications and changes can be made thereto without departing from the spirit and scope of the present disclosure defined by the appended claims.

What is claimed is:

1. A method for preventing duplicate allocation of an ID, which prevents duplicate allocation of an ID at a time of sequentially and automatically allocating IDs to battery modules configured in plurality, the method comprising:
    an ID allocation checking process for checking whether IDs are respectively allocated to battery modules, when external power is input;
    an ID deletion process for deleting the IDs of all the ID-allocated battery modules, when it is checked that there is a battery module to which an ID is not allocated in the ID allocation checking process; and
    a battery module termination process for terminating all the battery modules so as to enable IDs of the battery modules to be reallocated, after the IDs allocated to all the ID-allocated battery modules are deleted in the ID deletion process,
    wherein when it is checked that the IDs are allocated to all the battery modules in the ID allocation checking process, the IDs allocated already are used.

2. The method of claim 1, wherein the ID allocation checking process further comprises a use number checking process for checking a pre-stored number of battery modules to be used, wherein it is checked whether the IDs as many as the number of battery modules to be used are allocated.

3. The method of claim 1, wherein in the ID allocation checking process, whether the ID is allocated is checked by receiving an ID response signal through a communication connector.

4. The method of claim 3, wherein the communication connector is connected only to a battery module to be driven.

5. A method for preventing duplicate allocation of an ID, which prevents duplicate allocation of an ID at a time of sequentially and automatically allocating IDs to battery modules configured in plurality, the method comprising:
    a communication connector connection checking process for checking, when one battery module is to be used, connection of a communication connector of the battery module to be used;
    an ID deletion process for deleting IDs of all ID-allocated battery modules, when the communication connector of the battery module to be used is connected; and
    a battery module termination process for terminating driving of the battery modules so as to enable IDs of the battery modules to be reallocated, after the IDs allocated to the battery modules are deleted in the ID deletion process,
    wherein when it is checked that the communication connector of the battery module to be used is not connected in the communication connector connection checking process, the IDs allocated already are used.

6. The method of claim 5, wherein the connection of the communication connector is disconnected in the battery module termination process.

7. The method of claim 5, wherein the communication connector is connected only to a battery module to be driven.

8. A method for preventing duplicate allocation of an ID, which prevents duplicate allocation of an ID at a time of sequentially and automatically allocating IDs to battery modules configured in plurality, the method comprising:
    a communication connector connection checking process for checking connection of a communication connector of a battery module to which an ID of a master Battery Management System (BMS) is allocated, when a plurality of battery modules are used;
    an ID deletion process for deleting all ID-allocated battery modules, when it is checked that two communication connectors of the battery module to which the ID of the master BMS are connected in the communication connector connection checking process; and
    a process for using the IDs allocated already, when it is checked that one communication connector of the battery module to which the ID of the master BMS is allocated in the communication connector connection checking process.

9. A device comprised in a BMS configured in plurality in each battery module and for preventing duplicate allocation of an ID at a time of sequentially and automatically allocating IDs to the battery modules, wherein each of the battery modules comprises:
    a communication unit configured to check connection of a communication connector and transmit/receive a signal to/from another battery module through the communication connector;
    an ID allocation determination unit configured to determine whether an ID is allocated to the battery module on a basis of the signal transmitted/received through the communication unit, when an external voltage is applied;
    a storage unit configured to store the ID allocated to the battery module and a number of battery modules to be used; and
    a number checking unit configured to check the number of battery modules to be used through the storage unit.

10. The device of claim 9, wherein the communication unit transmits an ID response signal, when an ID request signal is received which has been transmitted from a battery module to which an ID of a master BMS is allocated.

11. The device of claim 9, wherein the stored IDs are deleted from the storage unit, when an ID deletion signal is transmitted from a battery module to which an ID of a master BMS is allocated.

12. The device of claim 11, further comprising:
    a battery module termination unit configured to terminate driving of the battery modules, when the stored IDs are deleted from the storage unit.

* * * * *